US008992207B2

(12) United States Patent
Dull et al.

(10) Patent No.: US 8,992,207 B2
(45) Date of Patent: Mar. 31, 2015

(54) CURE TOOL WITH INTEGRATED EDGE BREATHER AND METHOD OF MAKING THE SAME

(71) Applicant: The Boeing Company, Chicago, IL (US)

(72) Inventors: Kenneth M. Dull, Puyallup, WA (US); Michael K. Louie, Renton, WA (US); Gordon M. Cox, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/622,847

(22) Filed: Sep. 19, 2012

(65) Prior Publication Data

US 2013/0014901 A1    Jan. 17, 2013

Related U.S. Application Data

(62) Division of application No. 12/466,687, filed on May 15, 2009, now Pat. No. 8,298,473.

(51) Int. Cl.
*B29C 70/44* (2006.01)
*B29C 33/18* (2006.01)

(52) U.S. Cl.
CPC .................. *B29C 33/18* (2013.01); *B29C 70/44* (2013.01)
USPC ........... 425/388; 425/112; 425/389; 425/403; 425/501; 425/504

(58) Field of Classification Search
CPC ...... B29C 43/12; B29C 70/44; B29C 70/443; B29C 2043/3644; B29C 43/10; B29C 43/36; B29C 43/3642; B29C 2043/3647; B29C 2043/3649; B29C 2043/3657; B29C 2043/3605; B29C 43/3607; B29C 51/28; B29C 37/006; B29C 37/0064; Y10S 425/047
USPC ........... 425/112, 129.1, 387.1, 388, 389, 403, 425/405.1, 503, 504, 501, DIG. 60
See application file for complete search history.

(56) References Cited

U.S. PATENT DOCUMENTS

| 3,146,148 | A | * | 8/1964 | Mitchella et al. ............. 156/382 |
| 4,216,047 | A |   | 8/1980 | Hilliard et al. |
| 4,270,964 | A | * | 6/1981 | Flaskett ........................ 156/228 |
| 4,312,829 | A | * | 1/1982 | Fourcher ....................... 264/571 |
| 4,548,859 | A |   | 10/1985 | Kline et al. |
| 4,560,523 | A | * | 12/1985 | Plumley et al. ................ 264/102 |
| 4,622,091 | A |   | 11/1986 | Letterman |
| 4,664,737 | A | * | 5/1987 | Schlosstein ................... 156/285 |
| 4,869,770 | A | * | 9/1989 | Christensen et al. ......... 156/286 |
| 4,902,215 | A |   | 2/1990 | Seemann, III |
| 4,942,013 | A |   | 7/1990 | Palmer et al. |
| 4,975,311 | A | * | 12/1990 | Lindgren ....................... 428/156 |
| 5,009,687 | A | * | 4/1991 | Kromrey ........................ 65/106 |
| 5,052,906 | A |   | 10/1991 | Seemann |

(Continued)

OTHER PUBLICATIONS

Office Action, dated Aug. 17, 2011, regarding U.S. Appl. No. 12/466,687, 15 pages.

(Continued)

*Primary Examiner* — Seyed Masoud Malekzadeh
(74) *Attorney, Agent, or Firm* — Yee & Associates, P.C.

(57) ABSTRACT

A tool for curing a composite layup comprises a tool body having a surface adapted to support a composite layup thereon. The tool includes an integrated breather for allowing removal of air from the layup during curing.

15 Claims, 6 Drawing Sheets

(56) References Cited

U.S. PATENT DOCUMENTS

| | | | | |
|---|---|---|---|---|
| 5,059,273 | A * | 10/1991 | Boyce et al. | 156/307.4 |
| 5,242,651 | A | 9/1993 | Brayden et al. | |
| 5,306,448 | A * | 4/1994 | Kromrey | 264/29.5 |
| 5,316,462 | A * | 5/1994 | Seemann | 425/112 |
| 5,318,422 | A * | 6/1994 | Erland | 425/388 |
| 5,403,537 | A | 4/1995 | Seal et al. | |
| 5,439,631 | A | 8/1995 | Schneider et al. | |
| 5,439,635 | A * | 8/1995 | Seemann | 264/510 |
| 5,443,778 | A | 8/1995 | Schlingman | |
| 5,463,794 | A * | 11/1995 | Erland | 16/225 |
| 5,464,337 | A | 11/1995 | Bernardon et al. | |
| 5,589,016 | A | 12/1996 | Hoopingarner et al. | |
| 5,601,852 | A * | 2/1997 | Seemann | 425/112 |
| 5,665,301 | A | 9/1997 | Alanko | |
| 5,686,039 | A | 11/1997 | Merry | |
| 5,702,663 | A * | 12/1997 | Seemann | 264/510 |
| 5,709,893 | A | 1/1998 | McCarville et al. | |
| 5,714,179 | A * | 2/1998 | Goodridge et al. | 425/394 |
| 5,716,488 | A * | 2/1998 | Bryant | 156/382 |
| 5,939,013 | A | 8/1999 | Han et al. | |
| 6,024,555 | A * | 2/2000 | Goodridge et al. | 425/394 |
| 6,254,812 | B1 * | 7/2001 | Goodridge et al. | 264/39 |
| 6,440,566 | B1 * | 8/2002 | Maligie et al. | 428/412 |
| 6,555,045 | B2 | 4/2003 | McClure et al. | |
| 6,656,411 | B1 | 12/2003 | McClure et al. | |
| 6,840,750 | B2 * | 1/2005 | Thrash et al. | 425/129.1 |
| 6,861,017 | B1 | 3/2005 | McCarville et al. | |
| 6,958,105 | B2 * | 10/2005 | Herrmann et al. | 156/245 |
| 6,964,561 | B2 | 11/2005 | Louderback et al. | |
| 7,029,267 | B2 | 4/2006 | Caron | |
| 7,147,448 | B2 * | 12/2006 | Slaughter et al. | 425/129.1 |
| 7,338,628 | B2 * | 3/2008 | Sisk | 264/511 |
| 7,347,961 | B2 * | 3/2008 | Obrachta et al. | 264/156 |
| 7,413,695 | B2 * | 8/2008 | Thrash et al. | 264/257 |
| 7,510,385 | B2 * | 3/2009 | Sisk | 425/112 |
| 7,633,040 | B2 * | 12/2009 | Glain et al. | 219/633 |
| 7,681,835 | B2 | 3/2010 | Simpson et al. | |
| 7,842,209 | B2 * | 11/2010 | Wilenski et al. | 264/102 |
| 7,931,852 | B2 | 4/2011 | Kieffer | |
| 7,943,078 | B2 | 5/2011 | Sekido et al. | |
| 8,066,503 | B2 * | 11/2011 | Hawkins | 425/389 |
| 8,105,068 | B2 * | 1/2012 | Ross et al. | 425/388 |
| 8,303,757 | B2 * | 11/2012 | Glain et al. | 156/285 |
| 8,329,085 | B2 * | 12/2012 | Kurtz et al. | 264/258 |
| 8,333,864 | B2 * | 12/2012 | Brennan et al. | 156/285 |
| 2004/0032062 | A1 * | 2/2004 | Slaughter et al. | 264/511 |
| 2004/0187661 | A1 * | 9/2004 | Obrachta | 83/30 |
| 2004/0195716 | A1 * | 10/2004 | Bergmann | 264/101 |
| 2005/0253309 | A1 * | 11/2005 | Hou et al. | 264/571 |
| 2006/0080769 | A1 * | 4/2006 | Sisk | 4/538 |
| 2006/0233907 | A1 * | 10/2006 | Ruiz et al. | 425/387.1 |
| 2007/0090562 | A1 * | 4/2007 | Hawkins | 264/257 |
| 2007/0108665 | A1 * | 5/2007 | Glain et al. | 264/405 |
| 2007/0182071 | A1 | 8/2007 | Sekido et al. | |
| 2007/0194475 | A1 * | 8/2007 | Wilenski et al. | 264/40.6 |
| 2008/0136060 | A1 * | 6/2008 | Shpik et al. | 264/319 |
| 2008/0210372 | A1 * | 9/2008 | Cumings et al. | 156/286 |
| 2008/0283177 | A1 * | 11/2008 | Glain et al. | 156/160 |
| 2009/0321978 | A1 * | 12/2009 | Kurtz et al. | 264/101 |
| 2010/0112117 | A1 * | 5/2010 | Ross et al. | 425/388 |
| 2010/0213644 | A1 * | 8/2010 | Driver | 264/553 |
| 2010/0291258 | A1 | 11/2010 | Dull et al. | |
| 2010/0308515 | A1 * | 12/2010 | Green | 264/511 |
| 2010/0310886 | A1 * | 12/2010 | Green | 428/426 |
| 2012/0043704 | A1 * | 2/2012 | Hawkins | 264/511 |

OTHER PUBLICATIONS

Response to Office Action, dated Nov. 15, 2011, regarding U.S. Appl. No. 12/466,687, 21 pages.
Final Office Action, dated Jan. 31, 2012, regarding U.S. Appl. No. 12/466,687, 9 pages.
Response to Final Office Action, dated May 29, 2012, regarding U.S. Appl. No. 12/466,687, 4 pages.
Notice of Allowance, dated Jun. 20, 2012, regarding U.S. Appl. No. 12/466,687, 9 pages.

* cited by examiner

CURE TOOL WITH INTEGRATED EDGE BREATHER AND METHOD OF MAKING THE SAME

This application is a divisional application of U.S. application Ser. No. 12/466,687, entitled "CURE TOOL WITH INTEGRATED EDGE BREATHER AND METHOD OF MAKING THE SAME," filed May 15, 2009, issued as U.S. Pat. No. 8,298,473 on Oct. 30, 2012.

TECHNICAL FIELD

This disclosure generally relates to methods and equipment for curing up composite parts, and deals more particularly with a cure tool having an integrated edge breather and a method of making the tool.

BACKGROUND

Composite parts may be manufactured by laying up fiber reinforced composite plies on a tool either by hand or using automated fiber placement equipment. A vacuum bag may be placed over the layup and sealed to the tool. The part may then be cured, often by placing the layup in an autoclave where it is subjected to heat and pressure. During curing, a vacuum in the bag may help remove entrapped air and volatiles from the layup.

During the vacuum bagging process, edge breather materials may be placed adjacent or over the edges of the layup which allow the edges to "breathe" before and during curing. The breather materials maintain a volume of space around the edges of the layup so that the entrapped air and volatiles may escape the layup and be drawn away from the bag by the applied vacuum.

The breather materials may comprise, without limitation, non-woven nylon and polyester mats, woven fiberglass, as well as metal chains, braids and meshes. These types of breather materials may not be suited for re-use, and therefore may require replacement each time a layup is cured. The consumable nature of such breathers may render them costly to use in terms of both materials and the labor required to replace them after each cure cycle. Also, consumable types of breather materials may sometimes partially compress or collapse under the force applied by the bag, thereby reducing the volume of space around the edges of the layup which may in turn reduce the ability of the edges to breathe.

Accordingly, there is a need for an edge breather that eliminates the need for consumable breather materials while providing a relatively large and consistent volume of space around the edges of the layup that may aid in evacuating air and volatiles from the layup during curing.

SUMMARY

The disclosed embodiments provide an edge breather for use in curing composite layups that is integrated into a cure tool used in curing the layup, such as that used during autoclave curing. The breather is produced by forming permanent breathing features directly into the surface of the tool, thus eliminating the need for the repeated installation of consumable breather materials. Because the breather is integrated into the tool, the volume over which the edges of the layup are allowed to breathe may be controlled and remains constant to provide a substantially continuous breathing volume during the cure cycle. The disclosed edge breather may be particularly effective at higher curing pressures where prior consumable edge breathing materials may tend to "pinch-off" and thereby restrict air flow around the edges of the layup.

According to one disclosed embodiment, a tool is provided for curing a composite layup. The tool includes a tool body having a surface adapted to support a composite part layup thereon. The tool body includes a breather for allowing removal of air from the layup during curing. The breather is formed in the tool body surface as a network of recessed channels that extend substantially around a layup placed on the tool body surface. The network of channels includes a first set of channels extending generally parallel to each other, and a second set of channels extending traverse to the channels in the first set. The breather may further include at least one passageway in the tool body that is coupled with the network of channels and is adapted to be connected with a vacuum source for drawing air away from the edges of the layup through the channels.

According to another disclosed embodiment, a tool is provided for curing a composite layup that includes a tool body having an upper surface adapted to support a composite layup thereon. The tool body includes a plurality of channels in the upper surface that generally surround the layup. The channels are adapted to be coupled with a vacuum source for allowing the edges of the layup to breathe during curing of the layup. The channels may include first and second sets of channels that extend traverse to each other. At least one internal passageway in the tool body couples the channels with the vacuum source. The passageway may be coupled with the channels at the intersection of the two sets of channels, or within one of the channels. The channels may be laterally spaced apart from each other and may each have a cross section that is either generally U-shaped or V-shaped.

According to another embodiment a method is provided of making a tool for curing a composite layup. The method includes fabricating a tool body having a surface for supporting a layup thereon. The method further includes forming a breather in the tool body for allowing air to be drawn from the layup during curing. Forming the breather may include forming a breather area in the supporting surface of the tool body by forming channels in the supporting surface. Forming the breather may further include forming an air passageway in the tool body connected with the channels and adapted to be coupled with a vacuum source. The channels may be formed by machining or molding.

According to still another embodiment, a method is provided for removing air and volatiles from a composite layup during curing. The method includes placing the layup on a cure tool and vacuum bagging the layup. Channels in the cure tool are used to draw air and volatiles from edges of the layup by applying a vacuum to the channels.

The disclosed embodiments satisfy the need for an edge breather that may reduce or eliminate the need for consumable breather materials and which provides a relatively large, consistent volume around the edges of a layup to facilitate edge breathing.

BRIEF DESCRIPTION OF THE ILLUSTRATIONS

DETAILED DESCRIPTION

Figure 1:
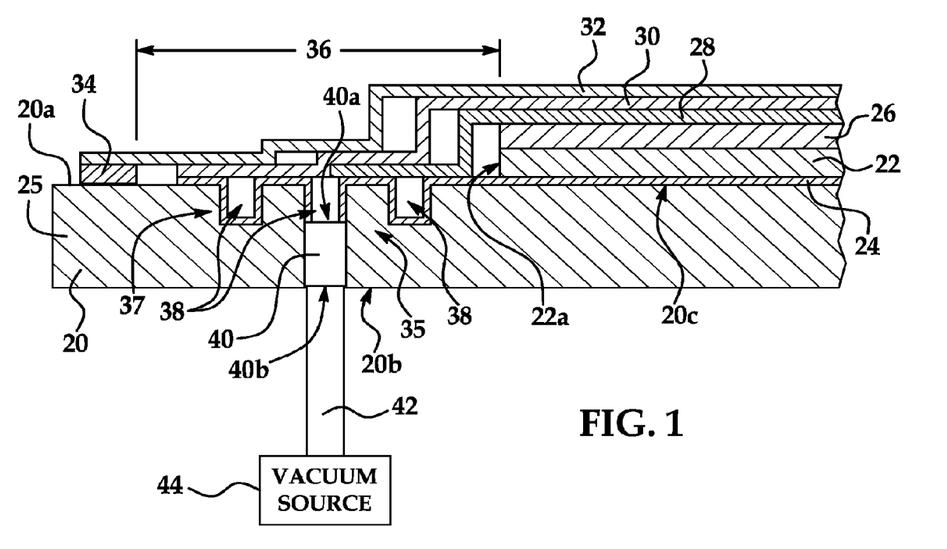
FIG. 1 is an illustration of a sectional view of a vacuum bagged part layup on a cure tool having an integrated breather according to the disclosed embodiments.
Figure 2:
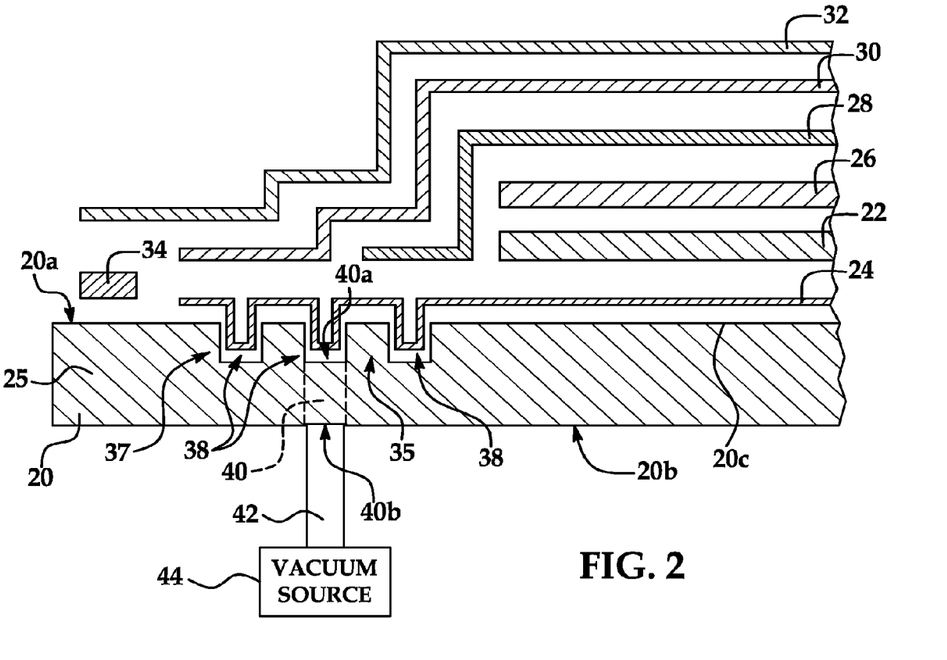
FIG. 2 is an illustration of a view similar to FIG. 1, but exploded to show the individual components.

Referring first to FIGS. 1 and 2, a cure tool 20 is used to cure a composite part layup 22 by any of various techniques, including but not limited to autoclave curing, oven curing, use of a pressclave, in-situ curing and others. The layup 22 may comprise multiple plies (not shown) of a fiber reinforced matrix material. The matrix material may comprise any of a wide variety of thermoset or thermoplastic resins. Similarly, the reinforcement may comprise any of a wide variety of continuous or non-continuous fibers, including but not limited to carbon/graphite, aramid and glass fibers, to name only a few. The fibers may be in the form of, without limitation, yarns, tapes, tows, rovings, woven or knitted fabric or mats. The cure tool 20 includes a body 25, which in the illustrated embodiment is substantially square, however a wide variety of other shapes are possible, depending on the application and the size and shape of the part layup 22.

The part layup 22 is supported on the upper surface 20a of the cure tool body 25, within a central region 20c. A vacuum bag 32 covers the part layup 22 and is sealed to the upper surface 20a of the body 25 by means of sealer tape 34 which extends around the entire perimeter of the part layup 22 to form a vacuum tight seal between the bag 32 and the tool 20. The vacuum bag 32 may comprise any of a variety of materials, including but not limited to a flexible polymer film, such as Nylon®, Kapton® or PVA (polyvinyl alcohol). The part layup 22 may be optionally covered by a caul plate 26 used to control the distribution of pressure applied to the part layup 22 during the cure cycle. A parting film 28 covers the caul plate 26 and aids in removing the bag 32 following the cure cycle. A surface breather 30 is sandwiched between the parting film 28 and the vacuum bag 32. A mold release film 24 may be applied to the upper surface 20a of the cure tool 20 in order to facilitate release of the part layup 22, as well as the parting film 28 and surface breather 30, following completion of a cure cycle. It should be noted here that FIGS. 1 and 2 illustrates only one type of bagging technique and that the disclosed embodiments may be used with a variety of other bagging techniques in which edge breathing is necessary or desirable.

An edge breather 35 is formed in the cure tool 20 along its periphery 36, between the outer edges 22a of the part layup 22 and the sealer tape 34. The edge breather 35 comprises a network 37 of channels that includes channels 38 formed in the upper surface 20a of the tool body 25. As used herein, the term "channel" or "channels" is used in its broadest sense, and is intended to include, without limitation, openings, recesses, grooves, slots, crevices and depressions formed in the surface 20a of the tool body 25 which have a size and/or a configuration sufficient to receive and collect air and volatiles drawn from the part layup 22 through the edges 22a the during the cure process. The channels 38 may have cross sections that are constant or which vary over their lengths. As best illustrated in FIG. 1, the parting film 28 and the surface breather 30 may cover one or more of the channels 38 without materially reducing airflow from the edges 22a into the channels 38.

The breather 35 further includes an internal air passageway 40 passing through the thickness of the tool body 25. The passageway 40 includes an inlet opening 40a which, in the embodiment illustrated in FIGS. 1 and 2 is coupled with the bottom of one of the channels 38. The passageway 40 also has an outlet 40b penetrating the lower surface 20b of the tool body 25. The outlet 40b is adapted to be coupled with a vacuum source 44 via a vacuum line 42. The vacuum source 44 reduces the air pressure within the network 37 of channels 38, thereby drawing entrapped air and volatiles from the edges 22a of the part layup 22 through the channels 38, passageway 40 and vacuum line 42. In order to evacuate the air and volatiles from the edges of the layup 22 at the breather 35, an external through-the-bag connection may be placed above channels 38 and connected to the vacuum source in lieu of the passageway 40 in the tool.

The body 25 of the cure tool 20 may be fabricated from various types of materials, depending upon the application, such as, for example and without limitation, metal, rubber and composites such as carbon fiber. The channels 38 may be formed in the cure tool 20 using any of various techniques, depending upon the application and the type of material from which the cure tool 20 is made. For example and without limitation, the channels 38 may be formed by machining or molding.

Figure 3:
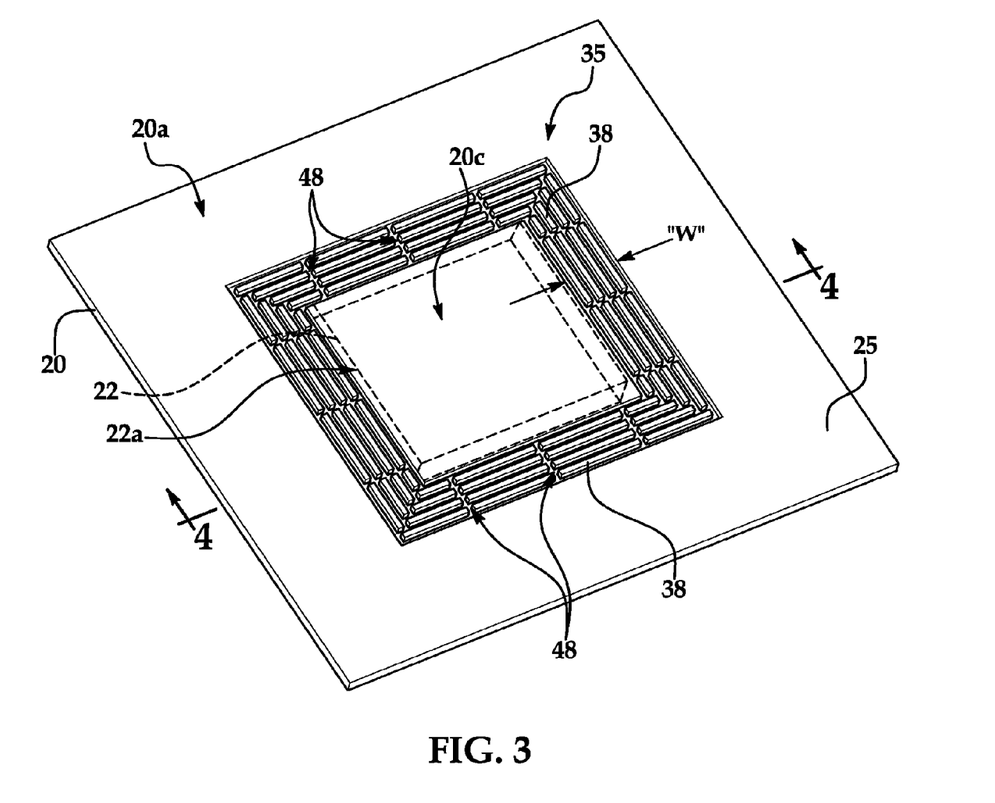
FIG. 3 is an illustration of a perspective view of one embodiment of the cure tool, the position of a composite part layup being illustrated in the phantom.
Figure 4:
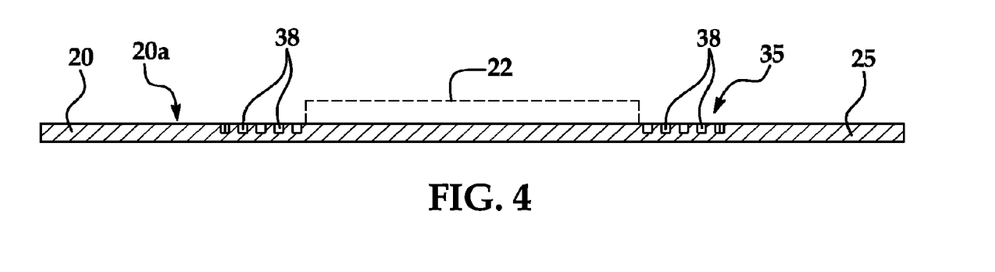
FIG. 4 is an illustration of a sectional view taken along the line 4-4 in FIG. 3.

Attention is now directed to FIGS. 3 and 4 which illustrate one configuration of the breather 35 in which the network 37 of channels comprises a first set of substantially parallel channels 38 and a second set of channels 48. The first set of channels 38 has a width "W" arranged in a generally square configuration substantially surrounding the outer edges 22a of the part layup 22. In this embodiment, as best seen in FIG. 4, each of the channels 38 in the first set thereof has a cross section that is generally U-shaped. The channels 38 are laterally spaced apart, and are interconnected by the second set of channels 48 in the surface 20a of the tool body 25. The channels 48 in the second set thereof are spaced apart from each other and extend transversely through and intersect the first set of channels 38. Channels 48 therefore interconnect channels 38 to assist in equalizing the pressure in the channels 38 and allow a free cross-flow of air between channels 38 during the air evacuation process. The presence of the channels 48 also helps in maintaining constant air flow through the channels 38 in the event that one of more of the channels 38 becomes partially blocked. The size, number, shape and depth of channels 38, 48 may vary depending upon the application and the type and geometry of the part layup 22, and the volume of air required to be evacuated.

Figure 5:
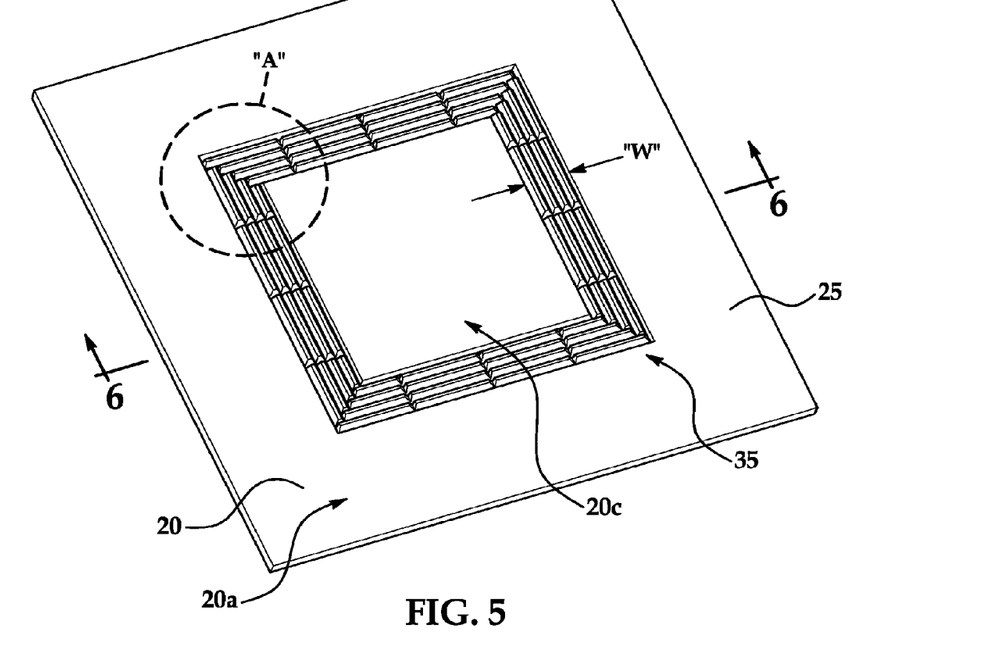
FIG. 5 is an illustration similar to FIG. 3 but depicting an alternate embodiment of the breather.
Figure 6:
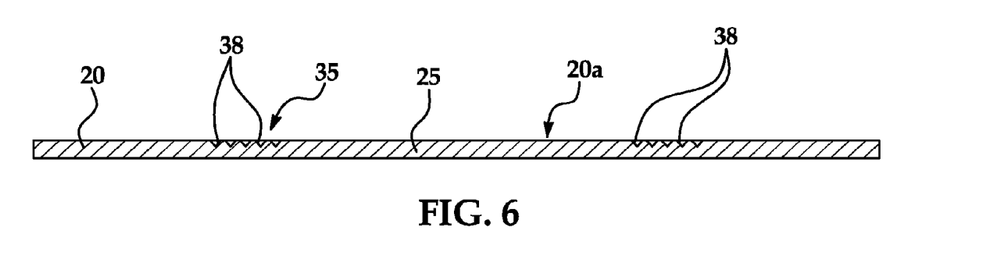
FIG. 6 is an illustration of a sectional view taken along the line 6-6 in FIG. 5.
Figure 7:
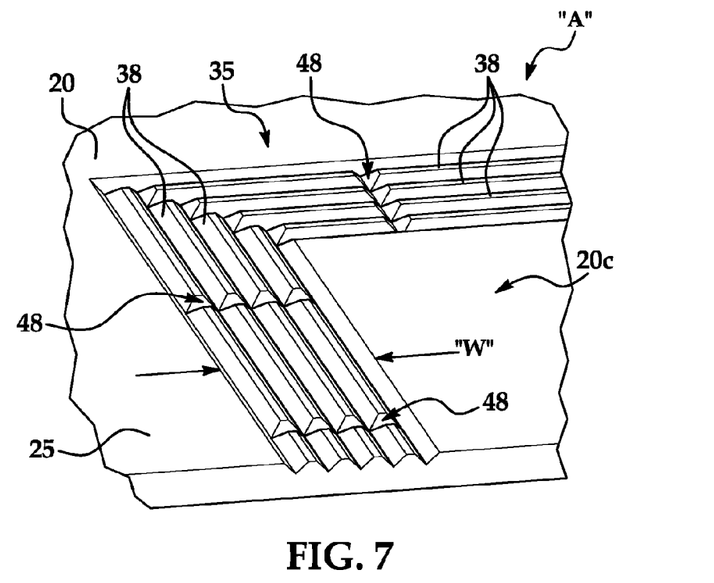
FIG. 7 is an illustration of the area designated as "A" in FIG. 5.
Figure 8:
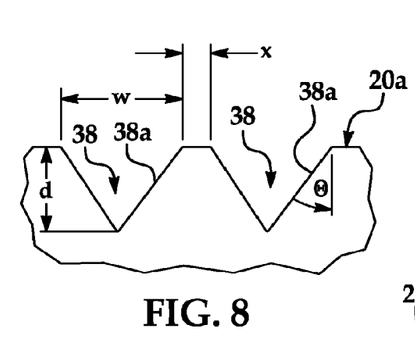
FIG. 8 is an illustration of a view showing the cross sectional shape of the channels in FIGS. 5-7.

FIGS. 5, 6 and 7 illustrate another form of the breather 35 in which the channels 38 are laterally spaced apart and have a cross section that is generally V-shaped. FIG. 8 illustrates additional details of the channels 38 shown in FIGS. 5-7. Each of the channels 38 has a depth "d" and an overall width "w". The inclined sides 38a of the channels 38 form an angle θ relative to the upper surface 20a of the cure tool 20. The channels 38 may be spaced apart a distance "x". The values of "d", "w", "x" and θ will depend upon the application and a variety of factors, including the number of channels 38 and the volume of entrapped air and reaction volatiles that are to be removed from the part layup 22 during the cure process. It should be noted here that although U-shaped and V-shaped channels 38 have been disclosed, a wide variety of other shapes are possible.

Figure 9:
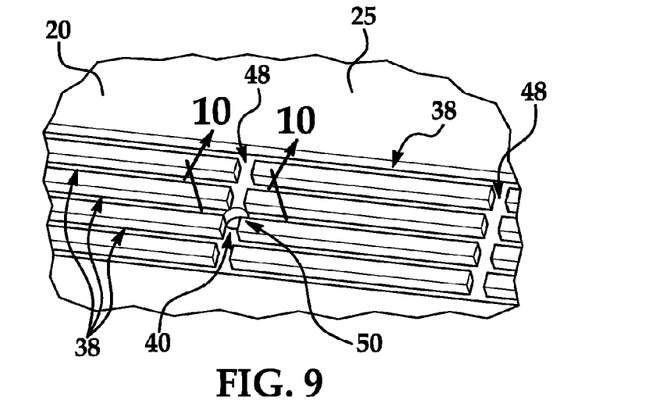
FIG. 9 is an illustration of a perspective view of the channels shown in FIGS. 3 and 4, and further showing an internal passageway located at an intersection between two sets of the channels.
Figure 10:
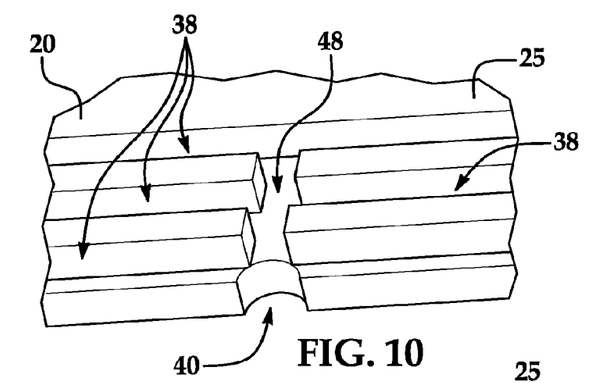
FIG. 10 is an illustration of a sectional view taken along the line 10-10 in FIG. 9.
Figure 11:
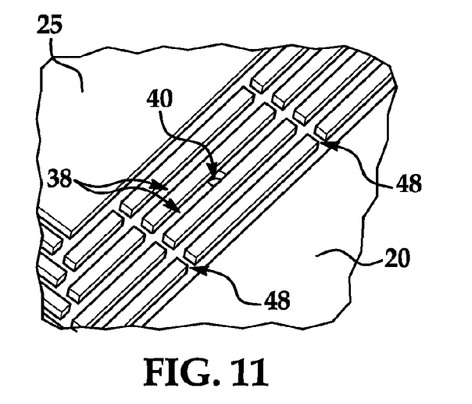
FIG. 11 is an illustration of a perspective view similar to FIG. 9 but showing the passageway located within a channel.

Referring now to FIGS. 9 and 10, the number of passageways 40 formed in the cure tool 20 will depend upon the application and the amount of entrapped air and volatiles that are to be removed. In some applications, a single passageway 40 may be adequate, while in other applications more than one passageway 40 may be desirable or necessary. In the example illustrated in FIGS. 9 and 10, the passageway 40 is located at the intersection 50 of one of the channels 38 with one of the channels 48. Alternatively, as illustrated in FIG. 11, one or more passageways 40 may be located entirely within one of the channels 38, at some point between adjacent ones of the channels 48.

Figure 12:
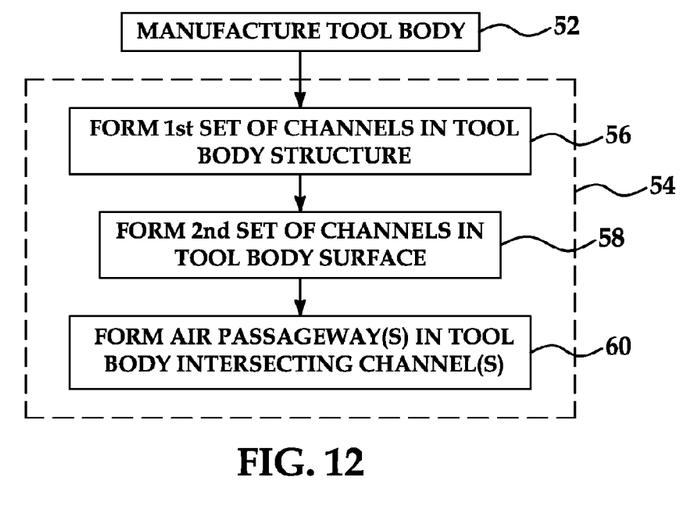
FIG. 12 is an illustration of a flow diagram of a method of making a cure tool having an integrated breather.

Attention is now directed to FIG. 12 which broadly illustrates the overall steps involved in a method of manufacturing the previously described cure tool 20 having an integrated breather 35. Beginning at step 52, the body 25 of the tool 20 is manufactured to the desired shape, dimensions and thickness, including an upper surface 20a having a desired contour which, in the embodiments previously described is substantially flat. However, other tool surface geometries are possible.

Next at 54, a breather 35 is formed in the body 25 of the tool 20 manufactured in step 52. Forming the breather 54 includes forming a first set of channels 38 in the tool surface 20a, as shown at step 56. At step 58, a second set of channels 48 is formed in the tool surface 20a which extend traverse to and intersect the first set of channels 38. As previously mentioned, the network 37 of channels 38, 48 formed in steps 56 and 58 may be produced by machining, molding or other known forms of material removal and/or production processes. At step 60, one or more passageways 40 are formed in the body 25 of the tool 20, also by machining, drilling, molding or similar types of production processes.

Figure 13:
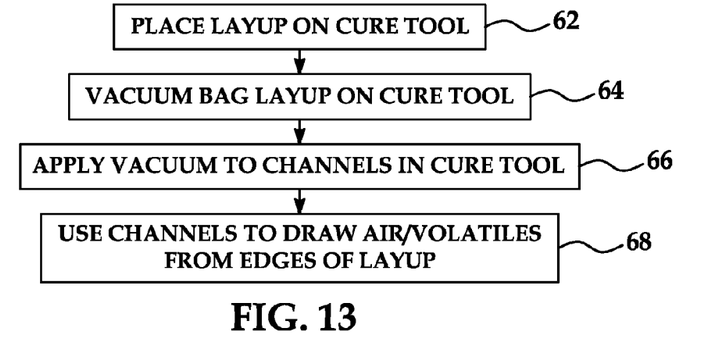
FIG. 13 is an illustration of a flow diagram of a method for removing air and volatiles from a composite layup during curing.

Referring now to FIG. 13, the disclosed embodiments provide a method of removing air and/or volatiles from a layup 22. The method may begin at step 62, in which the layup 22 is placed on a cure tool 20. The layup 22 is vacuum bagged at 64. At 66, a vacuum is applied to channels 38 in the cure tool 20, and at step 68, the channels 38 are used to draw air and/or volatiles from the edges 22a (FIG. 1) of the layup 22.

Figure 14:
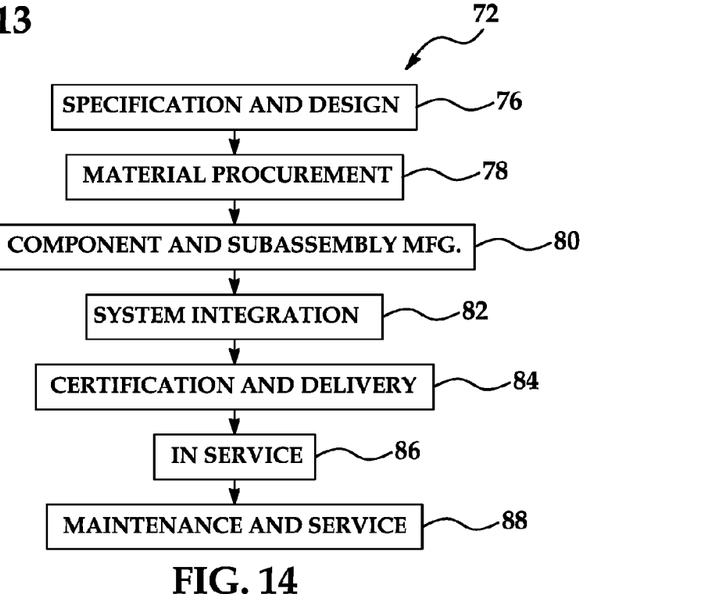
FIG. 14 is an illustration of a flow diagram of aircraft production and service methodology.
Figure 15:
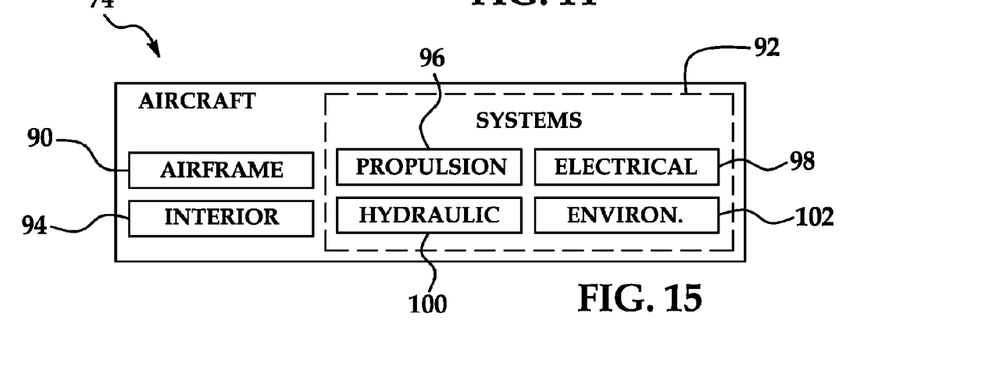
FIG. 15 is an illustration of the block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 72 as shown in FIG. 14 and an aircraft 74 as shown in FIG. 15. During pre-production, exemplary method 72 may include specification and design 76 of the aircraft 74 and material procurement 78 in which the disclosed cure tool 20 may be specified for use in curing parts or components used in the aircraft 74. During production, component and subassembly manufacturing 80 and system integration 82 of the aircraft 74 takes place. The disclosed cure tool 20 may be used to co-cure part layups during these production processes. Thereafter, the aircraft 74 may go through certification and delivery 84 in order to be placed in service 86. While in service by a customer, the aircraft 74 is scheduled for routine maintenance and service 88 (which may also include modification, reconfiguration, refurbishment, and so on). The disclosed method may be used to cure replacement composite parts which are installed during the maintenance and service 88.

Each of the processes of method 72 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 74 produced by exemplary method 72 may include an airframe 90 with a plurality of systems 92 and an interior 94. The disclosed cure tool may be used to cure composite parts which form part of, or may be installed on the airframe 90. Examples of high-level systems 92 include one or more of a propulsion system 96, an electrical system 98, a hydraulic system 100, and an environmental system 102. Any number of other systems may be included. Although an aerospace example is shown, the principles of the disclosure may be applied to other industries, such as the marine and automotive industries.

The cure tool and method of making the same may be employed to cure composite parts during any one or more of the stages of the production and service method 72. For example, components or subassemblies corresponding to production process 80 may incorporate composite parts that are cured using the disclosed cure tool. Also, one or more method embodiments, or a combination thereof may be utilized during the production stages 80 and 82, for example, by substantially expediting assembly of or reducing the cost of an aircraft 74. Similarly, the disclosed cure tool may be used to cure composite parts that are utilized while the aircraft 74 is in service.

Although the embodiments of this disclosure have been described with respect to certain exemplary embodiments, it is to be understood that the specific embodiments are for purposes of illustration and not limitation, as other variations will occur to those of skill in the art.

What is claimed:

1. A tool comprising a tool body having a central region that supports a composite layup thereon as the composite layup cures, the tool body comprising a breather comprising a first set of abutting laterally spaced apart grooves, in a surface of the tool body, that surround the central region between an outer edge of the central region and a sealer tape, the first set of abutting laterally spaced apart grooves being connected by a second set of grooves, which are spaced apart from each other and extend transversely through and intersect the first set of grooves, such that the breather:
    eliminates a need for consumable breather materials;
    removes air and volatiles through an edge of the layup during curing, the edge of the composite layup being a side of the composite layup that extends away from the surface of the tool body; and provides a substantially continuous and constant breathing volume, which the edge of the layup breathes through, surrounding the central region during a cure cycle.

2. The tool of claim 1, wherein the breather is recessed within the surface of the tool body, and the composite layup cures in an autoclave.

3. The tool of claim 1, wherein the breather includes a network of channels in the surface of the tool body.

4. The tool of claim 3, wherein the network of channels includes:
   a first set of channels extending generally parallel to each other.

5. The tool of claim 3, wherein the breather includes at least one passageway in the tool body coupled with the network of channels and configured to be connected with a vacuum source for drawing air away from the edge of the layup through the network of channels.

6. A tool for curing a composite layup, comprising:
   a tool body comprising an upper surface that supports the composite layup within a central region thereon, the tool body comprising a plurality of channels in the upper surface generally surrounding the central region, the plurality of channels being coupled with a vacuum source such that edges of the composite layup release air through a breather during curing of the composite layup, the breather comprising a first set of abutting laterally spaced apart grooves, in the upper surface of the tool body, that surround the central region between an outer edge of the central region and a sealer tape, the first set of abutting laterally spaced apart grooves being connected by a second set of grooves, which are spaced apart from each other and extend transversely through and intersect the first set of grooves, such that the breather
   provides a substantially continuous and constant breathing volume, which the respective edge of the layup breathes through, surrounding the central region during a cure cycle;
   eliminates a need for consumable breather materials while curing the composite layup; and
   removes air and volatiles through the respective edge of the layup during curing, the respective edge of the composite layup being a side of the composite layup that extends away from the upper surface of the tool body.

7. The tool of claim 6, wherein the plurality of channels includes:
   a first set of channels extending generally parallel to each other; and
   a second set of channels extending traverse to and intersecting the first set of channels.

8. The tool of claim 7, further comprising:
   at least one internal passageway in the tool body coupling the plurality of channels with the vacuum source.

9. The tool of claim 8, wherein the at least one internal passageway is located at an intersection between the first set of channels and the second set of channels.

10. The tool of claim 8, wherein the at least one internal passageway is located within one of the first set of channels and the second set of channels and passes through the tool body.

11. The tool of claim 6, wherein the curing the composite layup comprises autoclave curing the composite layup.

12. The tool of claim 6, wherein a cross section of each of the plurality of channels is one of:
   a U-shape; and
   a V-shape.

13. The tool of claim 6, wherein the plurality of channels is outwardly spaced from and extending substantially around the layup.

14. The tool of claim 6, wherein the tool body is one of:
   metal,
   rubber; and
   a composite.

15. An autoclave cure tool an integrated breather comprising:
   a tool body comprising: an upper surface that supports a composite part layup in a central region thereon, and a lower surface; and
   the breather being integrally formed within the tool body and surrounding the central region, the breather comprising a first set of abutting laterally spaced apart grooves, in the upper surface of the tool body, that surround the central region between an outer edge of the central region and a sealer tape, the first set of abutting laterally spaced apart grooves being connected by a second set of grooves, which are spaced apart from each other and extend transversely through and intersect the first set of grooves, such that the breather
   provides a substantially continuous and constant breathing volume, which an edge of the layup breathes through, surrounding the central region during a cure cycle;
   eliminates a need for consumable breather materials while curing the composite part layup; and
   removes air and volatiles through the edge of the layup during curing, the edge of the composite layup being a side of the composite layup that extends away from the upper surface of the tool body;
   a plurality of channels, comprising a first set of channels and a second set of channels, the first set of channels having two generally parallel, laterally spaced apart channels located in the upper surface of the tool body and extending substantially around the composite part layup placed on the upper surface, and the second set of channels being located spaced apart in the upper surface and extending traverse to and interconnecting the first set of channels, each set of channels comprising the set of abutting laterally spaced apart grooves;
   at least one internal air passageway in the tool body having an inlet coupled with the plurality of channels at an intersection of the first set of channels and the second set of channels; and
   an outlet configured to be coupled with a vacuum source for drawing air from edge of the composite part layup being cured.

* * * * *